(12) United States Patent
Park et al.

(10) Patent No.: US 10,684,715 B2
(45) Date of Patent: Jun. 16, 2020

(54) DISPLAY APPARATUS AND MANUFACTURING METHOD THEREOF

(71) Applicant: SAMSUNG ELECTRONICS CO., LTD., Suwon-si (KR)

(72) Inventors: Jeong-hyun Park, Suwon-si (KR); Young-ran Han, Seoul (KR); Ki-ock Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 88 days.

(21) Appl. No.: 15/790,282

(22) Filed: Oct. 23, 2017

(65) Prior Publication Data

US 2018/0120990 A1    May 3, 2018

(30) Foreign Application Priority Data

Oct. 31, 2016 (KR) .......................... 10-2016-0143366

(51) Int. Cl.
  *G06F 3/041* (2006.01)
  *G06F 3/047* (2006.01)
  *G06F 3/044* (2006.01)

(52) U.S. Cl.
  CPC ............ *G06F 3/0412* (2013.01); *G06F 3/044* (2013.01); *G06F 3/047* (2013.01); *G06F 2203/04103* (2013.01)

(58) Field of Classification Search
  CPC .................. G06F 3/0412; G06F 3/047; G06F 2203/04103; G06F 3/044; G06F 3/041;
  (Continued)

(56) References Cited

U.S. PATENT DOCUMENTS

| 9,098,154 B2 | 8/2015 | Cok |
| 2007/0152977 A1* | 7/2007 | Ng ...................... G06F 3/03547 345/173 |

(Continued)

FOREIGN PATENT DOCUMENTS

| JP | 2016-133937 A | 7/2016 |
| KR | 10-2011-0020049 A | 3/2011 |

(Continued)

OTHER PUBLICATIONS

Communication dated Mar. 19, 2018 issued by the International Searching Authority in counterpart International Patent Application No. PCT/KR2017/011428 (PCT/ISA/210 & PCT/ISA/237).

(Continued)

*Primary Examiner* — Md Saiful A Siddiqui
(74) *Attorney, Agent, or Firm* — Sughrue Mion, PLLC

(57) ABSTRACT

There is provided a display apparatus including a first substrate, a second substrate arranged to be in parallel with the first substrate, a plurality of light emitting elements arrayed in a matrix form on a surface of the first substrate facing the second substrate, a light-emitting-device driving wiring line formed on the surface of the first substrate, which outputs a driving signal to the plurality of light emitting elements to selectively turn on and off the plurality of light emitting elements, a touch sensing wiring line formed between the first substrate and the second substrate, arrayed to intersect the light-emitting-device driving wiring line, which outputs a sensing signal corresponding to a touch input of a user and a plurality of insulators provided in a plurality of areas on the light-emitting-device driving wiring line or the touch sensing wiring line.

16 Claims, 12 Drawing Sheets

(58) Field of Classification Search
CPC .... G06F 3/046; G09G 3/3208; G09G 3/3225;
G09G 3/3486
See application file for complete search history.

(56) References Cited

U.S. PATENT DOCUMENTS

| | | | |
|---|---|---|---|
| 2008/0239214 A1* | 10/2008 | Lee | G02F 1/13338 |
| | | | 349/106 |
| 2010/0220075 A1 | 9/2010 | Kuo et al. | |
| 2012/0168789 A1 | 7/2012 | Lin | |
| 2012/0242248 A1* | 9/2012 | Drummond | H05B 33/0851 |
| | | | 315/297 |
| 2012/0249436 A1 | 10/2012 | Choi et al. | |
| 2013/0194204 A1 | 8/2013 | Kang et al. | |
| 2014/0049504 A1 | 2/2014 | Cok | |
| 2016/0188083 A1 | 6/2016 | Shi et al. | |
| 2016/0342233 A1* | 11/2016 | Lee | G06F 3/042 |
| 2016/0349903 A1* | 12/2016 | Yun | G06F 3/0416 |
| 2017/0092691 A1* | 3/2017 | Tso | H01L 33/62 |
| 2018/0059869 A1* | 3/2018 | Ma | G06F 3/0412 |

FOREIGN PATENT DOCUMENTS

| | | |
|---|---|---|
| KR | 10-1240919 B1 | 3/2013 |
| KR | 1020160072646 A | 6/2016 |

OTHER PUBLICATIONS

Communication dated Mar. 27, 2018 issued by the European Patent Office in counterpart European Patent Application No. 17197808.3.

\* cited by examiner

DISPLAY APPARATUS AND MANUFACTURING METHOD THEREOF

CROSS-REFERENCE TO RELATED THE APPLICATION

This application claims priority from Korean Patent Application No. 10-2016-0143366 filed on Oct. 31, 2016 in the Korean Intellectual Property Office, the disclosure of which is incorporated herein by reference in its entirety.

BACKGROUND

Field

Apparatuses and methods consistent with the exemplary embodiments relate to a display apparatus for displaying an image by processing an image signal and a manufacturing method thereof, and more particularly to a display apparatus having an improved structure to facilitate a touch-input function in a display of a light emitting diode (LED) display structure and a manufacturing method thereof.

Description of the Related Art

A related art electronic apparatus includes a central processing unit (CPU), a chipset, a memory, and the like electronic components, to compute and process predetermined information in accordance with certain processes. Such an electronic apparatus may be classified variously in accordance with what information will be processed therein. For example, the electronic apparatus is classified into an information processing apparatus such as a personal computer, a server or the like for processing general information, and an image processing apparatus for processing image information.

The image processing apparatus receives a content signal including video data from the exterior and processes the video data extracted from the content signal in accordance with various image processing processes. The image processing apparatus may display an image based on the processed video data on its own display, or output the processed video data to another apparatus provided with a display so that the corresponding apparatus can display an image based on the processed image signal. The image processing apparatus that has the display is called a display apparatus, and may for example includes a TV, a monitor, a portable multimedia player (PMP), a tablet computer, a mobile phone, etc.

The display apparatus has been increasingly used outdoors like an outdoor billboard or an outdoor stage as well as indoors. Due to characteristics of outdoor environments, the display apparatus used outdoors may be different in a structure of a display from a display apparatus typically used indoors. For example, the display of the display apparatus used outdoors has to have extendibility, high brightness, a vast color gamut, etc. for a relatively large screen so that a plurality of users can view it at a long distance. To meet such characteristics, the outdoor display apparatus may not employ a liquid crystal display (LCD) panel typically used for an indoor or portable apparatus, but instead the outdoor display apparatus may employ a display panel including red, green and blue (RGB) light emitting diodes (LED) or mono color LEDs in units of pixel. For convenience, such a structure of the display will be called an LED display structure.

In accordance with purposes, the display apparatus having the LED display structure may be required to have a function of sensing a user's touch input in addition to displaying an image. To manufacture the display apparatus having such a touch input function, a touch sensing panel is typically stacked on an effective display area of the display. However, this structure increases the whole thickness of the display, and therefore deteriorates quality of an image to be viewed by a user. If the display is transparent, this structure may also deteriorate transparency. Accordingly, the display apparatus may be required to have an improved structure for solving these problems.

SUMMARY

According to an aspect of an exemplary embodiment, there is provided a display apparatus comprising: a first substrate, a second substrate arranged to be in parallel with the first substrate, a plurality of light emitting elements arrayed in a matrix form on a surface of the first substrate facing the second substrate, a light-emitting-device driving wiring line formed on the surface of the first substrate and configured to output a driving signal to the plurality of light emitting elements to selectively turn on and off the plurality of light emitting elements, a touch sensing wiring line formed between the first substrate and the second substrate, arrayed to intersect the light-emitting-device driving wiring line, and configured to output a sensing signal corresponding to a touch input of a user and a plurality of insulators provided in a plurality of areas on the light-emitting-device driving wiring line or the touch sensing wiring line, wherein a first insulator, among the plurality of insulators, is provided at an area where the light-emitting-device driving wiring line and the touch sensing wiring line intersect with each other, and wherein the first insulator is configured to insulate the light-emitting-device driving wiring line and the touch sensing wiring line from each other.

The display apparatus further comprises a processor configured to output the driving signal to each of the light emitting element through the light-emitting-device driving wiring line, and sense the touch input based on the sensing signal output from the touch sensing wiring line.

The processor may be configured to adjust light emitting characteristics of one or more light emitting elements corresponding to a touch position where the touch input is sensed.

The light emitting characteristics to be adjusted may comprise at least one of brightness, saturation, intensity and hue of the light emitting element.

The processor may be further configured to determine the light emitting elements within a preset range with respect to coordinates of the touch position where the touch input is sensed, among the plurality of light emitting elements.

The processor may be further configured to adjust the light emitting characteristic of the light emitting element by increasing a current level of the light emitting characteristic of the light emitting element by a preset first level, or replacing the current level of the light emitting characteristic of the light emitting element by a preset second level.

The processor may be further configured to display a user interface (UI), which allows a user to set the preset first level or the preset second level, in response to a preset input event, and store the preset first level or the preset second level set through the UI.

The processor may be further configured to divide an area around the touch position into two or more areas, and process the light emitting characteristic of the light emitting element to be differently adjusted according to the two or more areas.

The processor may be further configured to determine a first area within a first radius of the touch position and a second area within a second radius of the touch position not including the first area, and process the light emitting elements within the first area and the light emitting elements within the second area to be differently adjusted in light emitting characteristics.

The plurality of insulators may be spaced apart from each other so that the plurality of insulators do not entirely cover the surface of the first substrate.

The touch sensing wiring line may comprise a plurality of first wiring lines extended in a first direction and forming an electromagnetic field when voltage is applied, and a plurality of second wiring lines extended in a second direction different from the first direction and outputs the sensing signal generated by variations in electric charges of the electromagnetic field The plurality of insulators respectively may insulate intersections between the light-emitting-device driving wiring line and the first wiring lines, and intersections between the first wiring lines and the second wiring lines.

The light emitting element may comprise a light emitting diode (LED).

The first substrate and the second substrate may comprise a transparent material.

The first substrate may comprise a transparent material, and the second substrate may comprise an opaque material.

The plurality of insulators may be formed on a plurality of separate areas on the light-emitting-device driving wiring line.

According to an aspect of the another exemplary embodiment, there is provided a method of manufacturing a display of a display apparatus, the method comprising: mounting a plurality of light emitting elements in a matrix form on a surface of a first substrate, forming a light-emitting-device driving wiring line on the surface of the first substrate, the light-emitting-device driving wiring line being configured to outputs a driving signal to the plurality of light emitting elements to selectively turn on and off the plurality of light emitting elements, forming a plurality of insulators on the light-emitting-device driving wiring line, forming a touch sensing wiring line on the surface of the first substrate so that the touch sensing wiring line is insulated from the light-emitting-device driving wiring line by one of the plurality of insulators, the touch sensing wiring line configured to output a sensing signal corresponding to a touch input of a user and covering the surface of the first substrate with a second substrate.

The plurality of insulators may be formed on a plurality of separate designated areas on the light-emitting-device driving wiring line.

According to an aspect of another exemplary embodiment, there is provided a display apparatus comprising: a plurality of light emitting diodes (LEDs) arrayed in a matrix form on a surface of a first substrate, a LED driving wiring line formed on the surface of the first substrate and configured to output a driving signal to drive the plurality of LEDs, a touch sensing wiring line formed on the first substrate and configured to output a sensing signal corresponding to a touch input of a user and a processor configured to determine at least one LED, among the plurality of LEDs, located within an area surrounding a location where the touch input is sensed by the touch sensing wiring line and adjust an output characteristic of the at least one LED.

The processor may be further configured to retrieve setting information based on a type of the touch input, and adjust the output characteristic of the at least one LED in accordance with the setting information.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. The following descriptions of the exemplary embodiments are made by referring to elements shown in the accompanying drawings, in which like numerals refer to like elements having substantively the same functions.

In the description of the exemplary embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the invention.

Figure 1:
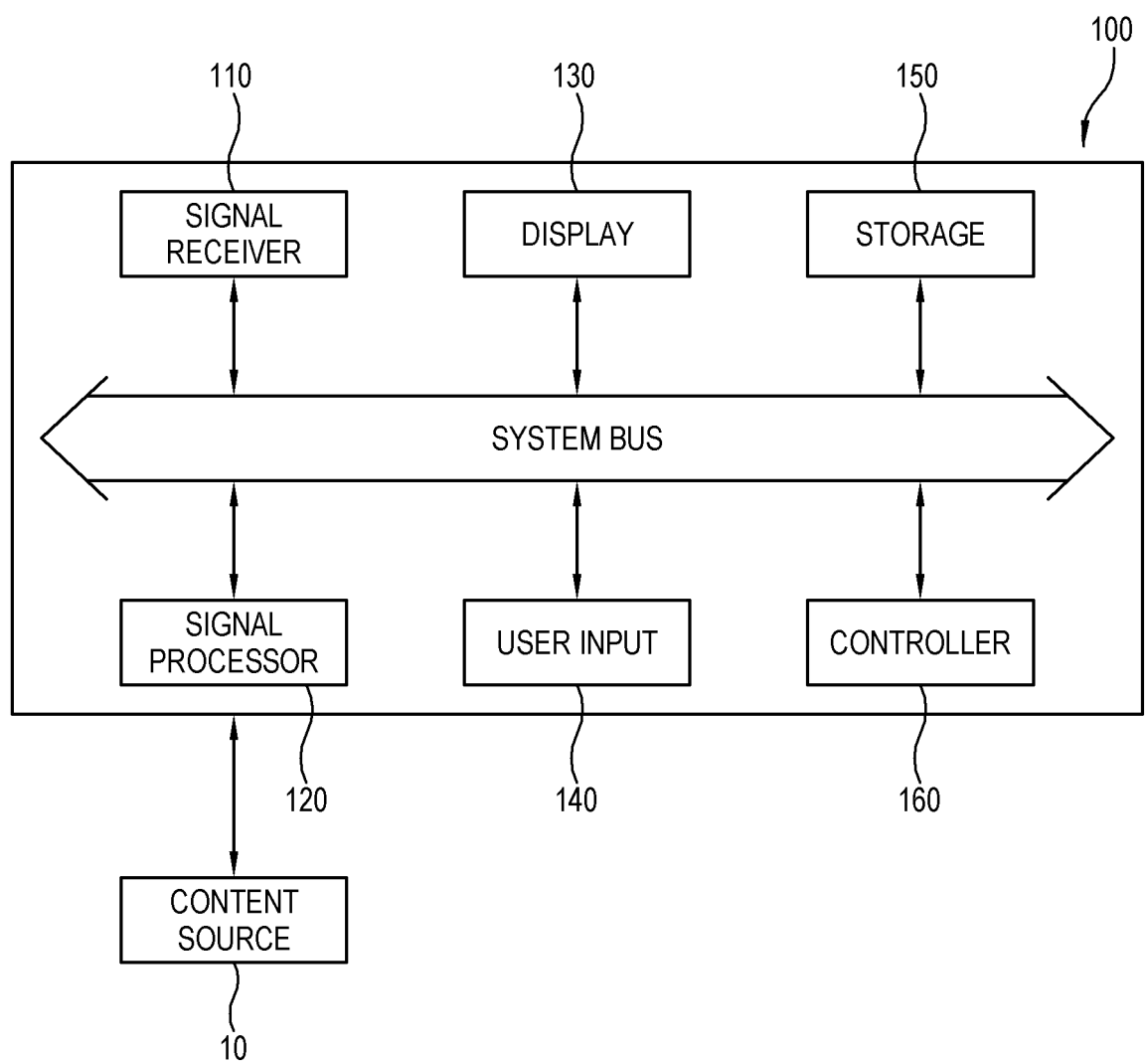
FIG. 1 is a block diagram of a display apparatus according to an exemplary embodiment.

FIG. 1 is a block diagram of a display apparatus according to an exemplary embodiment.

As shown in FIG. 1, the display apparatus 100 according to an exemplary embodiment includes an apparatus having a relatively large screen to be used outdoors like a digital signage, etc. rather than an apparatus having a relatively small screen to be used indoors. The digital signage and similar display apparatuses may not have a liquid crystal display (LCD) or organic light emitting diode (OLED) display structure generally used in a television (TV), a monitor, a mobile device, etc. Instead, the digital signage and similar display apparatuses may have an light emitting diode (LED) display structure as will be described later.

The display apparatus 100 includes a signal receiver 110 for receiving a content signal from various content sources 10, a signal processor 120 for processing the content signal received in the signal receiver 110, a display 130 for displaying a content image based on the content signal processed by the signal processor 120, a user input 140 for receiving a user's input, a storage 150 for storing data, and a controller 160 for performing calculations for the process of the signal processor 120 and control for general operations of the display apparatus 100. These elements are connected to one another through a system bus. The elements set forth herein are directly related to the display apparatus 100 according to the exemplary embodiments of the present disclosure.

The signal receiver 110 includes a communication module for receiving a content signal from the content source 10 or various similar external apparatuses. The signal receiver 110 is an element for receiving a signal or data from the exterior, but not limited thereto. Alternatively, the signal receiver 110 may be used for interactive communication. For example, the signal receiver 110 includes at least one among elements such as a tuning chip to be tuned to a frequency designated for a radio frequency (RF) broadcast signal, an Ethernet module to receive packet data from the Internet by a wire, a wireless communication module to wirelessly receive packet data in accordance with various standards such as Wi-Fi, Bluetooth, etc., a connection port to which a universal serial bus (USB) memory and the like external memory is connected, etc. That is, the signal receiver 110 includes a data input interface where communication modules or ports respectively corresponding to various kinds of communication protocols are combined.

The signal processor 120 performs various processes with respect to a content signal received in the signal receiver 110 so that content can be reproduced. The signal processor 120 includes a hardware processor realized by a chipset mounted to a printed circuit board, a circuit, a buffer and the like, and may be designed as a system on chip (SoC) as necessary. Fundamentally, the signal processor 120 processes a video signal component extracted from a content signal so that a content image can be displayed on the display 130.

The content signal may include various signal components such as an audio signal component, an appendix signal component, etc. as well as a video signal component. Thus, the signal processor 120 extracts necessary signal components by demultiplexing the content signal. For example, the signal processor 120 extracts a video signal component by separating packets of the multiplexed content signal in accordance with packet identification (PID). Of course, when the content signal includes only the video signal component, the demultiplexing process may be omitted. When the display apparatus 100 includes a loudspeaker, the signal processor 120 processes the video signal component and the audio signal component in accordance with respective corresponding processes, and then outputs the video signal component to the display 130 and the audio signal component to the loudspeaker.

In terms of processing the video signal component, the signal processor 120 performs decoding, image enhancement, scaling and the like video processes with regard to the video signal component, and outputs the video signal component subjected to the video processes to the display 130.

The display 130 displays an image based on the video signal component processed by the signal processor 120. Various structures and designs may be applied to the display 130 for displaying an image. In this exemplary embodiment the display 130 has the LED display structure.

The LED display structure of the display 130 may be achieved by combination of substrates each of which is mounted with mono color LEDs or RGB LEDs. Besides, the display 130 may be achieved by combination of LEDs corresponding to colors such as white, magenta, cyan, yellow, etc. In the LED display structure, the LED of mono color may constitute one pixel, or the LEDs of RGB colors may constitute one pixel. With the LED display structure, an image is displayed on a full screen by individually turning on and off the mono color LED or RGB LEDs within each pixel.

The display 130 having the LED display structure may be designed as a transparent display or an opaque display. Further, the display 130 may include a touch sensing structure for sensing a user's touch input. The touch sensing structure will be described later.

The user input 140 transmits various preset control command or information to the controller 160 in response to a user's control or input. That is, the user input 140 sends the controller 160 various events corresponding to a user's intention, so that the controller 160 can operate corresponding to the event. The user input 140 may be achieved in various forms in accordance with the types of display apparatus 100. For example, the user input 140 may include a key provided in the main body of the display apparatus 100 or a remote controller separated from the main body of the display apparatus 100, etc.

The storage 150 stores various pieces of data under the control of the controller 160. The storage 150 is accessed by the signal processor 120 or the controller 160 so that the data can be read, written, modified, updated and so on. The storage 150 includes a nonvolatile memory such as a flash memory, a hard disc drive (HDD), a solid state drive (SSD) and the like to retain data regardless of whether the display apparatus 100 is powered on or off; and a volatile memory such as a buffer, a random access memory (RAM) and the like to which data to be processed by the signal processor 120 or the controller 160 is temporarily loaded.

The controller 160 is achieved by a central processing unit (CPU), a microprocessor, etc. to control operations of elements such as the signal processor 120 in the display apparatus 100, and perform calculations for the processes in the signal processor 120.

With the foregoing structure, the display apparatus 100 displaying a content image on the display 130 and senses a user's touch input on a surface of the display 130. According to an exemplary embodiment, the display 130 has a transparent LED display structure. Below, the display 130 with this transparent LED structure of will be described.

Figure 2:
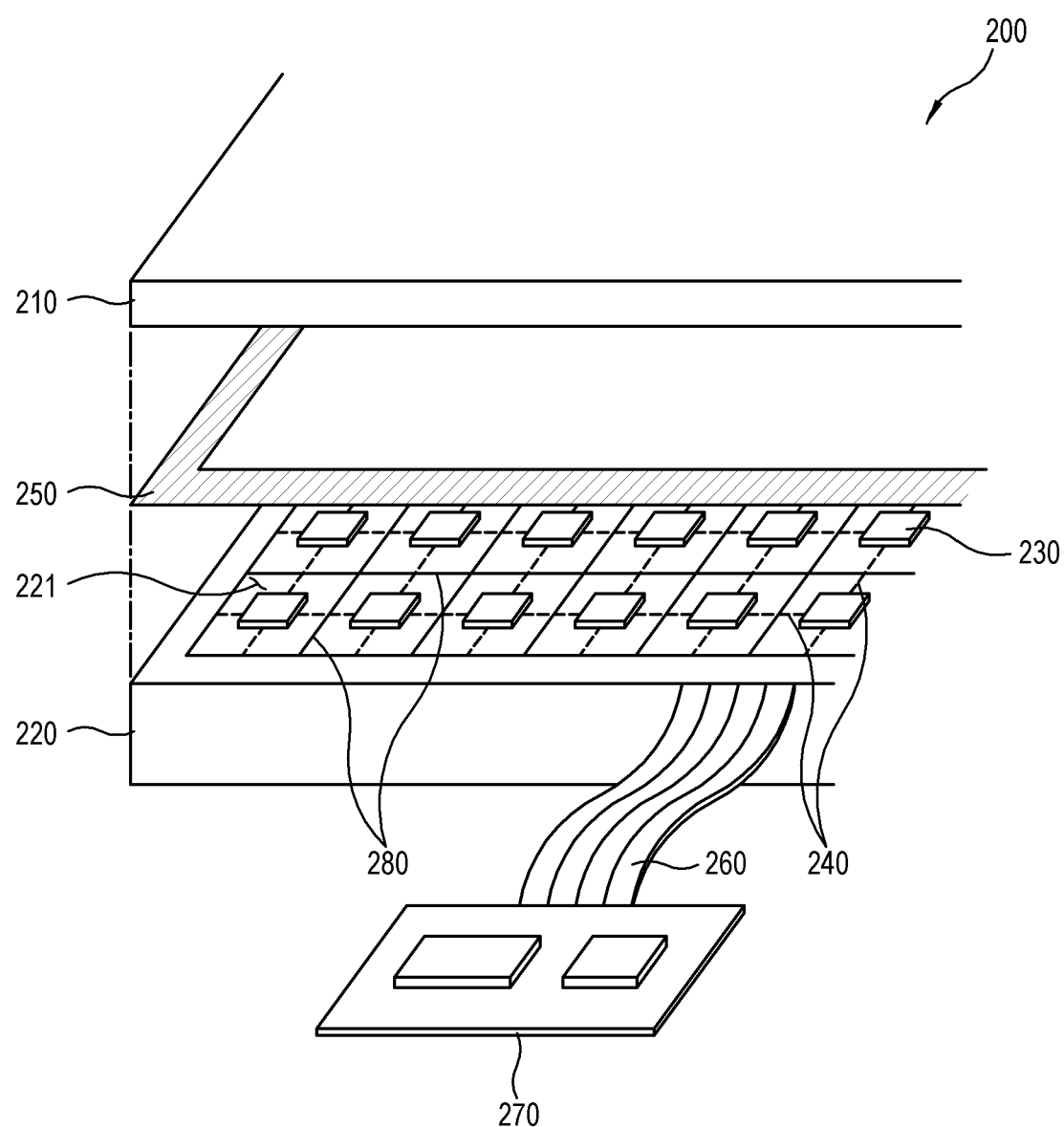
FIG. 2 is an exploded perspective view of a display of the display apparatus according to an exemplary embodiment.

FIG. 2 is an exploded perspective view of a display of the display apparatus according to an exemplary embodiment.

As shown in FIG. 2, the display of the display apparatus includes a first substrate 210, a second substrate 220, a plurality of light emitting elements 230 provided on one surface 221 of the second substrate 220, a light-emitting-device driving wiring line 240 formed on the surface 221 where the light emitting elements 230 is provided, an adhesive member 250 interposed in between the first substrate 210 and the second substrate 220, a flexible printed circuit board (FPCB) 260 connected to the light-emitting-device driving wiring line 240 of the second substrate 220, and a processing board 270 connected to the FPCB 260. Further, the display 200 according to an exemplary embodiment includes a touch sensing electrode 280 provided on the surface 221 of the second substrate 220.

The first substrate 210 and the second substrate 220 may not have a transparency lower than a predetermined level. Further, the first substrate 210 and the second substrate 220 are for example made of plastic, glass or the like material having electrically insulating properties. The first substrate 210 and the second substrate 220 may be the same or different with respect to the transparency. The first substrate 210 and the second substrate 220 face with each other so that the plurality of light emitting elements 230 can be sandwiched between the first substrate 210 and the second substrate 220.

In this exemplary embodiment both the first substrate 210 and the second substrate 220 are substantially transparent so that a user can view through the display 200. In this case, the display apparatus may further include a bezel caused by a frame for supporting the edges of the display 200, and the FPCB 260, a processing board 270 and the like are hidden behind the bezel.

Alternatively, the second substrate 220 may be made of an opaque material, or may be designed to have a separate cover for covering the surface opposite to the surface 221 of the second substrate 220. Even in this case, the first substrate 210 is transparent so that a user can view an image displayed by the light emitting elements 230.

The light emitting elements 230 may be for example achieved by a semiconductor light emitting element chip that emits light with supplied power or a driving signal. The plurality of light emitting elements 230 may be arranged having a matrix form on the surface 221 of the second substrate 220 facing the first substrate 210. The display 200 according to an exemplary embodiment has the LED display structure different from the LCD display structure or the OLED display structure. Therefore, the light emitting elements 230 individually form respective pixels of the display 200.

For example, in case of a structure for displaying a monotone image, a mono color light emitting element 230 forms one pixel of the display 200. On the other hand, in case of a structure for displaying a color image, a set of a light emitting element for emitting red light, a light emitting element for emitting green light and a light emitting element for emitting blue light may form one pixel of the display 200. In this embodiment, the mono color light emitting elements 230 will be described for simple description of the present inventive concept. However, the present inventive concept may be applied to the RGB light emitting elements 230.

The light-emitting-device driving wiring line 240 electrically connects the FPCB 260 and the light emitting elements 230. The light-emitting-device driving wiring line 240 transmits a driving signal output from the FPCB 260 to each of the light emitting elements 230, so that the light emitting elements 230 can be turned on and off by the driving signal. The light-emitting-device driving wiring line 240 is printed on the surface 221 of the second substrate 220 in accordance with array patterns of the plurality of light emitting elements 230. In this embodiment the light-emitting-device driving wiring line 240 is patterned in a matrix form for connecting the respective light emitting elements 230, but this is one example of various wiring line patterns. Alternatively, the wiring line pattern may be variously designed.

The light-emitting-device driving wiring line 240 may be made of various conductive materials, for example, conductive paint. When the light-emitting-device driving wiring line 240 is made of the conductive paint, it is easy for a manufacturer to form the light-emitting-device driving wiring line 240 on the second substrate 220 by printing during a manufacturing process. Further, the light-emitting-device driving wiring line 240 is transparent to make an area of the display 200, where the light emitting elements 230 are not placed, be transparent.

The adhesive member 250 is interposed in between the first substrate 210 and the second substrate 220 and thus couples the first substrate 210 and the second substrate 220. The adhesive member 250 may for example include optical clear adhesive (OCA), optical clear resin (OCR), pressure sensitive adhesive (PSA), etc. as long as it can couple the first substrate 210 and the second substrate 220. The adhesive member 250 may make the entire surfaces of the first and second substrates 210 and the 220 adhere to each other. In this case, the adhesive member 250 may be applied to both the area of the second substrate 220 where the light emitting element 230 is placed and the area where no light emitting elements 230 are placed, so that the second substrate 220 can adhere to the first substrate 210. Alternatively, the adhesive member 250 may be applied to not the entire surface between the first substrate 210 and the second substrate 220 but only the edges of the first substrate 210 and the second substrate 220 so that a gap can be formed in the areas where the light emitting elements 230 are placed.

The FPCB 260 electrically connects the light-emitting-device driving wiring line 240 and the processing board 270, so that a driving signal can be transmitted from the processing board 270 to the light emitting elements 230 through the light-emitting-device driving wiring line 240. The FPCB 260 is flexible, and therefore the processing board 270 is connectable with the light-emitting-device driving wiring line 240 while being accommodated in the bezel of the display 200.

The processing board 270 performs processes for general operations of the display apparatus 100 to display an image on the display 200, etc. The processing board 270 generates a driving signal corresponding to a video signal and transmits it to the light emitting elements 230, thereby driving the light emitting elements 230 to be turned on and off. The processing board 270 controls the light emitting elements 230 to be individually turned on and off, thereby displaying an image on the full screen of the display 200. The processing board 270 may be achieved by a printed circuit board mounted with a chipset, a SOC, a wiring line, etc.

The processing board 270 may have various ways of controlling the light emitting elements 230 to display an image. For example, the processing board 270 determines whether to turn on and off the light emitting elements 230 according to position coordinates based on processed results of a video signal, and individually transmits the driving signal to the respective light emitting elements 230. Further, the processing board 270 applies a driving voltage through the light-emitting-device driving wiring line 240 arranged in a horizontal direction, and applies a switching signal for turning on and off the light emitting elements 230 through the light-emitting-device driving wiring line 240 arranged in a vertical direction, thereby individually turning on and off the respective light emitting elements 230. The structure of displaying an image by turning on and off the light emitting elements 230 may be variously designed, and its detailed descriptions will be omitted.

According to an exemplary embodiment, the display apparatus 100 may further include the touch sensing electrode 280 for sensing a touch input. The touch sensing electrode 280 is provided on the surface 221 of the second substrate 220 where the light emitting elements 230 and the light-emitting-device driving wiring line 240 are arranged. Also, the touch sensing electrode 280 may be electrically connected to the FPCB 260, thereby sensing a user's touch input generated on the first substrate 210. The touch sensing electrode 280 may not be a film or panel placed separately from the display 200 and stacked on the first substrate 210, but instead, according to an exemplary embodiment, the touch sensing electrode 280 is provided on the surface 221 of the second substrate 220 between the first substrate 210 and the second substrate 220. Therefore, it is possible to manufacture the touch sensing electrode 280 together with the light-emitting-device driving wiring line 240 while forming the light-emitting-device driving wiring line 240 on the second substrate 220, and it is also possible to make the display 200 relatively thin.

Figure 3:
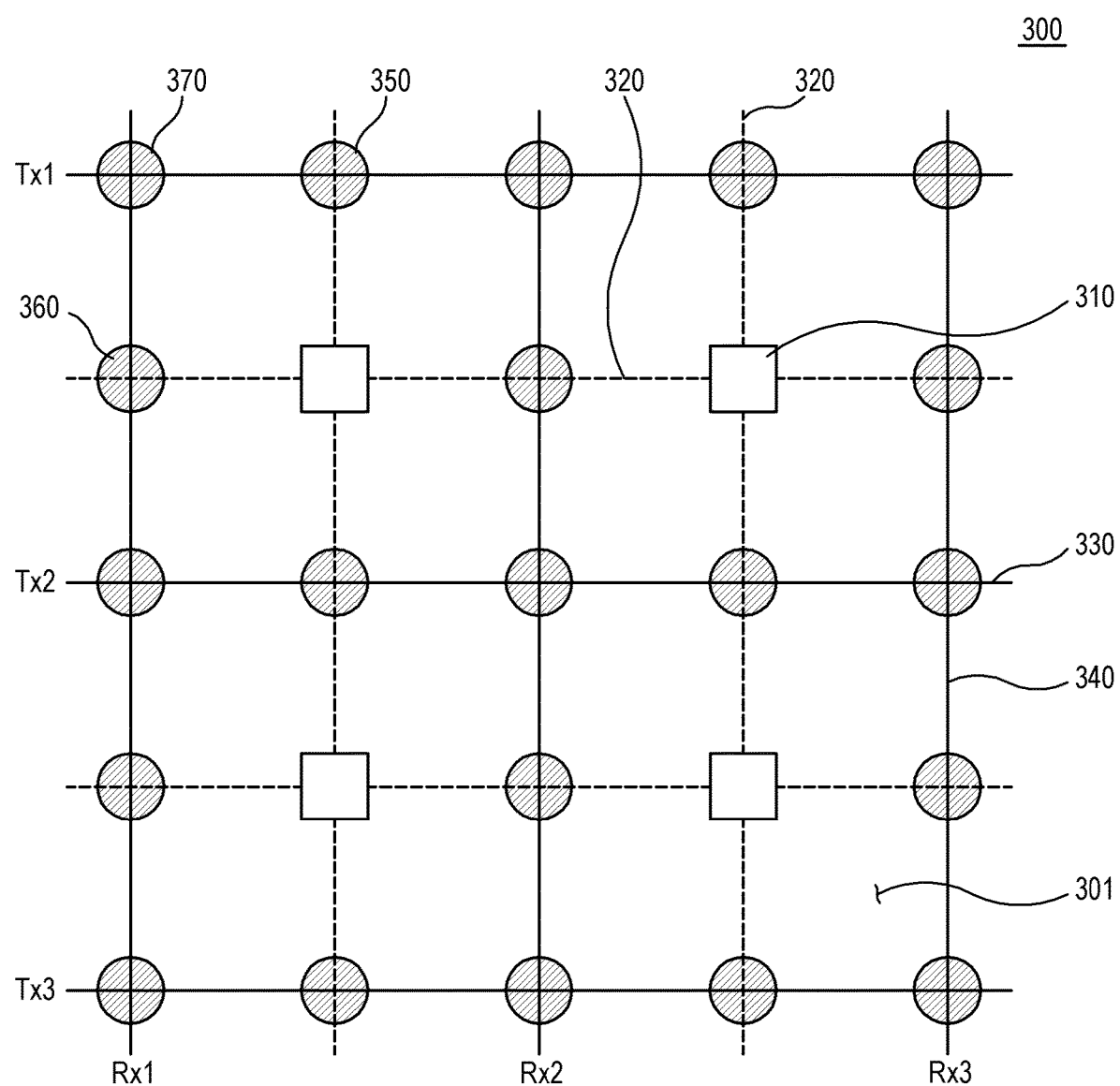
FIG. 3 is a partial plan view showing a wiring line structure in the display of the display apparatus according to an exemplary embodiment.

A detailed structure of the touch sensing electrode 280 according to an exemplary embodiment is illustrated in FIG. 3 as follows. FIG. 3 is a partial plan view of showing a wiring line structure in the display of the display apparatus according to an exemplary embodiment.

As shown in FIG. 3, a plurality of light emitting elements 310 are arrayed in a matrix form on a surface 301 of a second substrate of a display 300, and light-emitting-device driving wiring lines 320 for driving each light emitting element 310 are also formed on the surface 301. Further, a touch sensing electrode for sensing a touch input is formed on the surface 301, and includes a plurality of touch driving wiring lines 330 extended in a horizontal direction and a plurality of touch sensing wiring lines 340 extended in a vertical direction. Alternatively, the touch driving wiring lines 330 may be extended in the vertical direction, and the touch sensing wiring lines 340 may be extended in the horizontal direction.

The light-emitting-device driving wiring lines 320, the touch driving wiring lines 330 and the touch sensing wiring lines 340 may be made of various transparent materials such as conductive paint, or may be for example made of indium tin oxide (ITO), a metal mesh, a silver nano wire or a micro wire. Further, the light-emitting-device driving wiring lines 320, the touch driving wiring lines 330 and the touch sensing wiring lines 340 may be formed on the surface 301 by screen-printing, photolithography, laser ablation, etc.

According to an exemplary embodiment, the second substrate is an insulating substrate. Further, the light-emitting-device driving wiring lines 320 extended in the horizontal direction are parallel with the touch driving wiring lines 330, and the light-emitting-device driving wiring lines 320 extended in the vertical direction are parallel with the touch sensing wiring lines 340. In this manner, according to an exemplary embodiment, intersections where the light-emitting-device driving wiring lines 320 extended in the vertical direction intersect the touch driving wiring lines 330, and intersections where the light-emitting-device driving wiring lines 320 extended in the horizontal direction intersect the touch sensing wiring lines 340 may not be avoided. To normally turn on and off the light emitting element 310 and sense the touch input, the respective wiring lines have to be insulated from each other at these intersections.

As a method of insulating these intersections, the surface 301 printed with a certain wiring line is entirely coated with an insulating layer, and then another wiring line is printed on the insulating layer. However, this method wastefully consumes an insulating material and increases the whole thickness of the display 300 since even areas other than the intersections are unnecessarily coated with the insulating layer.

Accordingly, according to an exemplary embodiment, an insulators or insulation covers 350, 360 and 370 are interposed not in the entire surface 301 on which the light-emitting-device driving wiring lines 320, the touch driving wiring lines 330 and the touch sensing wiring lines 340 are provided, but the insulators or the insulation covers 350, 360 and 370 may be interposed only at the intersections where the different wiring lines intersect with each other, thereby preventing electric connection between the different wiring lines. The insulation covers 350, 360 and 370 are printed as a spot form at the intersections, and include various kinds of transparent materials such as insulating paint, etc.

According to an exemplary embodiment, order of printing the insulation covers 350, 360 and 370 is varied depending on which one of the light-emitting-device driving wiring lines 320, the touch driving wiring lines 330 and the touch sensing wiring lines 340 is first printed on the surface 301. For example, order of printing the insulation covers 350, 360 and 370 will be described in case where a manufacturer prints the light-emitting-device driving wiring lines 320, the touch driving wiring lines 330 and the touch sensing wiring lines 340 in order on the surface 301. Here, the insulation cover 350 insulates the light-emitting-device driving wiring lines 320 from the touch driving wiring lines 330 at the intersection between the light-emitting-device driving wiring lines 320 and the touch driving wiring lines 330, the insulation cover 360 insulates the light-emitting-device driving wiring lines 320 from the touch sensing wiring lines 340 at the intersection between the light-emitting-device driving wiring lines 320 and the touch sensing wiring lines 340, and the insulation cover 370 insulates the touch driving wiring lines 330 from the touch sensing wiring lines 340 at the intersection between the touch driving wiring lines 330 and the touch sensing wiring lines 340.

The operation includes printing the light-emitting-device driving wiring lines 320 on the surface 301 of the second substrate, and mounting the light emitting elements 310 on the light-emitting-device driving wiring lines 320 so that the light emitting elements 310 can electrically connect with the light-emitting-device driving wiring lines 320. In accordance with designs of the display 300, positions expected for the intersections between the light-emitting-device driving wiring lines 320 and the touch driving wiring lines 330 and the intersections between the light-emitting-device driving wiring lines 320 and the touch sensing wiring lines 340 are specified. Thereafter, the insulation covers 350 and 360 are printed at the specified positions.

Next, the touch driving wiring lines 330 are printed on the surface 301. Since the insulation cover 350 has already been printed, the light-emitting-device driving wiring lines 320 and the touch driving wiring lines 330 are insulated from each other by the insulation cover 350 at the intersections even though the touch driving wiring lines 330 are printed on the surface 301.

In accordance with designs of the display 300, positions expected for the intersections between the touch driving wiring lines 330 and the touch sensing wiring lines 340 are specified, and the insulation cover 370 are printed at the specified positions.

Thereafter, the touch sensing wiring lines 340 is printed on the surface 301. Since the insulation cover 370 has already been printed, the touch driving wiring lines 330 and the touch sensing wiring lines 340 are insulated from each other at the intersections by the insulation cover 370 even though the touch sensing wiring lines 340 are printed on the surface. Further, since the insulation cover 360 has already been printed, the light-emitting-device driving wiring lines 320 and the touch sensing wiring lines 340 are insulated from each other by the insulation cover 360 at the intersections.

Then, the FPCB is connected with each of the wiring lines, and the first substrate and the second substrate made to adhere to each other, thereby manufacturing the display 300.

In this manner, while manufacturing the display 300 according to an exemplary embodiment, it is possible to form the touch sensing structure in the substrate without additionally mounting any separate touch module to the display 300, thereby simplifying a stacking structure and decreasing a manufacturing cost.

Below, a method of sensing the touch input in the display apparatus with the foregoing structure will be described.

While a touch-input sensing function is activated, the display apparatus applies a sensing voltage to the plurality of touch driving wiring lines 330. No voltages are applied to the touch sensing wiring lines 340. The touch driving wiring lines 330 and the touch sensing wiring lines 340 are insulated from each other by the insulation cover 370, but a predetermined voltage is sensed in the touch sensing wiring lines 340 because of an electromagnetic field generated by the voltage applied to the touch driving wiring lines 330.

When any touch input is not made while applying the sensing voltage to the plurality of touch driving wiring lines 330 Tx1, Tx2 and Tx3 in sequence, voltages of substantially the same level are respectively sensed in the plurality of touch sensing wiring lines 340 Rx1, Rx2 and Rx3. According to an exemplary embodiment, when a voltage sensed in the touch sensing wiring lines 340 Rx3 is different in level from voltages sensed in the other touch sensing wiring lines 340 when the sensing voltage is applied to the touch driving wiring lines 330 Tx2, the display apparatus determines that a touch input is made at a position where the touch driving wiring line 330 Tx2 intersects the touch sensing wiring line 340 Rx3.

This is because electric charges due to the electromagnetic field of the touch driving wiring lines 330 Tx2 escape through a finger or the like when a user touches the display 300 with the finger or the like. Therefore, the voltage sensed in the touch sensing wiring lines 340 Rx3 is lower in level as much as the escaped electric charges than the other touch sensing wiring lines 340. Based on this principle, the display apparatus senses a position corresponding to a user's touch input through the touch driving wiring lines 330 and the touch sensing wiring lines 340.

Figure 4:
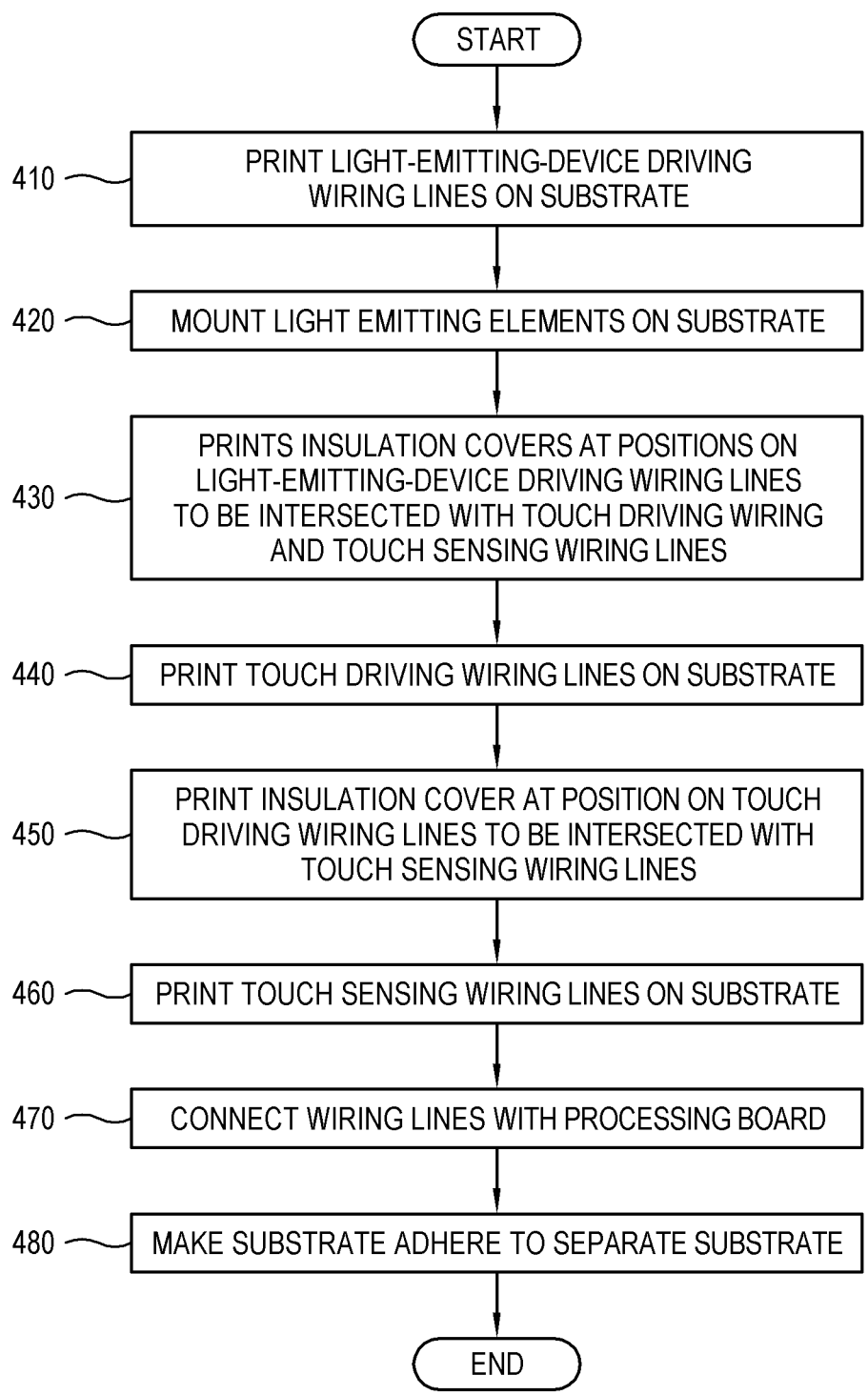
FIG. 4 is a flowchart of manufacturing the display of the display apparatus according to an exemplary embodiment.

FIG. 4 is a flowchart of manufacturing the display of the display apparatus according to an exemplary embodiment.

As shown in FIG. 4, at operation 410, light-emitting-device driving wiring lines are printed on a substrate.

At operation 420, light emitting elements are mounted on the substrate.

At operation 430, insulation covers are printed at positions on the light-emitting-device driving wiring lines to be intersected with touch driving wiring lines and touch sensing wiring lines.

At operation 440, the touch driving wiring lines are printed on the substrate.

At operation 450, the insulation cover is printed at position on the touch driving wiring lines to be intersected with the touch sensing wiring lines.

At operation 460, the touch sensing wiring lines are printed on the substrate.

At operation 470, the wiring lines are connected with the processing board.

At operation 480, the substrate is made to adhere to a separate substrate.

Thus, a display having the touch sensing function maybe manufactured by a manufacturer.

According to an exemplary embodiment, the light-emitting-device driving wiring lines, the touch driving wiring lines and the touch sensing wiring lines are printed in order on the substrate. However, the order of printing the respective wiring lines may be varied depending on the design, and timing of printing the insulation covers is also changed. That is, the timing of printing the insulation covers is determined based on which wiring lines will be insulated by the corresponding insulation covers at their intersections. For example, it will be taken into account that the light-emitting-device driving wiring line, the touch sensing wiring line and the touch driving wiring line are printed in sequence on the substrate. In this case, the insulation cover for insulating the intersection between the touch sensing wiring line and the touch driving wiring line has to be printed after the timing of printing the touch sensing wiring line.

According to an exemplary embodiment, the wiring lines and the insulation covers are formed by "printing", but one of various other methods may be used to form the wiring lines and the insulation covers on the substrate. That is, a manufacturer may employ various methods, which may include the "printing" method to form the wiring lines and the insulation covers on the substrate.

In the foregoing exemplary embodiments, the touch driving wiring lines for sensing a touch and the light-emitting-device driving wiring lines for controlling the light emitting elements are separated, but not limited thereto. Alternatively, the touch driving wiring lines and the light-emitting-device driving wiring lines may be integrated in accordance with how the processing board of the display apparatus drives the light emitting elements.

Figure 5:
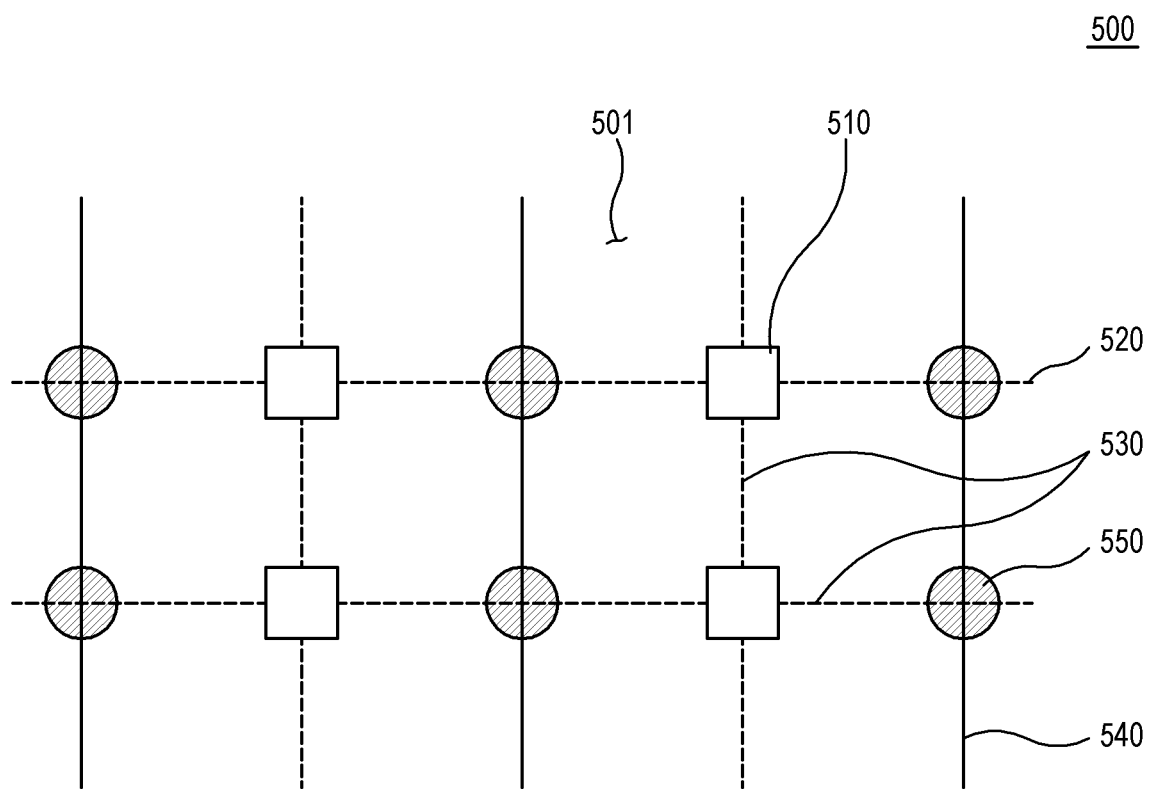
FIG. 5 is a partial plan view showing a wiring line structure in the display of the display apparatus according to an exemplary embodiment.

FIG. 5 is a partial plan view showing a wiring line structure in the display of the display apparatus according to an exemplary embodiment.

As shown in FIG. 5, a display 500 according to an exemplary embodiment includes a plurality of light emitting elements 510 arrayed in a matrix from on a surface 501 of a substrate, and light-emitting-device driving wiring lines 520 and 530 for driving the respective light emitting elements 510 are formed on the surface 501. The light-emitting-device driving wiring lines 520 and 530 includes voltage applying wiring lines 520 extended in the horizontal direction, and switching wiring lines 530 extended in the vertical direction. To drive the light emitting elements 510, the display apparatus applies a driving voltage to each light emitting element 510 through the voltage applying wiring line 520, and switches on and off the light emitting elements 510 through the switching wiring lines 530, thereby turning on and off the light emitting elements 510.

When displaying an image frame, the display apparatus does not simultaneously control all the light emitting elements 510, but controls the light emitting elements 510 to be turned on and off in sequence from a top row to a bottom row. That is, the display apparatus controls the light emitting elements 510 in a row corresponding to each scan line of the image frame by a progressive method, so that voltages can be sequentially applied to the plurality of voltage applying wiring lines 520.

Intersections between the voltage applying wiring lines 520 and touch sensing wiring lines 540 are insulated by insulation covers 550, and voltages are sensed from the touch sensing wiring lines 540 due to the voltage applying wiring lines 520. The insulation covers 550 may be formed by applying the method of the foregoing exemplary embodiment.

The display apparatus senses a touch input based on change in voltage sensed in the touch sensing wiring line 540 by the electromagnetic field of the voltage applying wiring line 520, while applying a voltage to the voltage applying wiring lines 520 to display an image. Here, the touch input is sensed by substantially the same principle as the foregoing exemplary embodiment. According to an exemplary embodiment, the light-emitting-device driving wiring line for driving the light emitting element is employed instead of a separate touch driving wiring line in order to form the electromagnetic field for sensing a touch. Thus, the display apparatus can sense a touch input by a simple structure.

According to an exemplary embodiment, since it may take considerably more time to process a touch input than to process a video signal, the touch input may be processed in a predetermined cycle in contrast to the processing of the image. For example, the display apparatus may not check a voltage applying timing in every voltage applying wiring line 520 whenever displaying one image frame, but the display apparatus may check the timing in every voltage applying wiring line 520 whenever displaying n image frames, where n is a positive number.

In addition, the display apparatus with the display having the touch sensing structure according to the foregoing exemplary embodiments may operate variously in response to a touch input. For example, when a position corresponding to the touch input is specified, the display apparatus adjusts an output characteristic or a light-emitting characteristic of a light emitting element corresponding to the specified position, so that a user can clearly recognize whether the display apparatus senses the touch input or where the touch input is made. In this regard, detailed descriptions are as follows.

Figure 6:
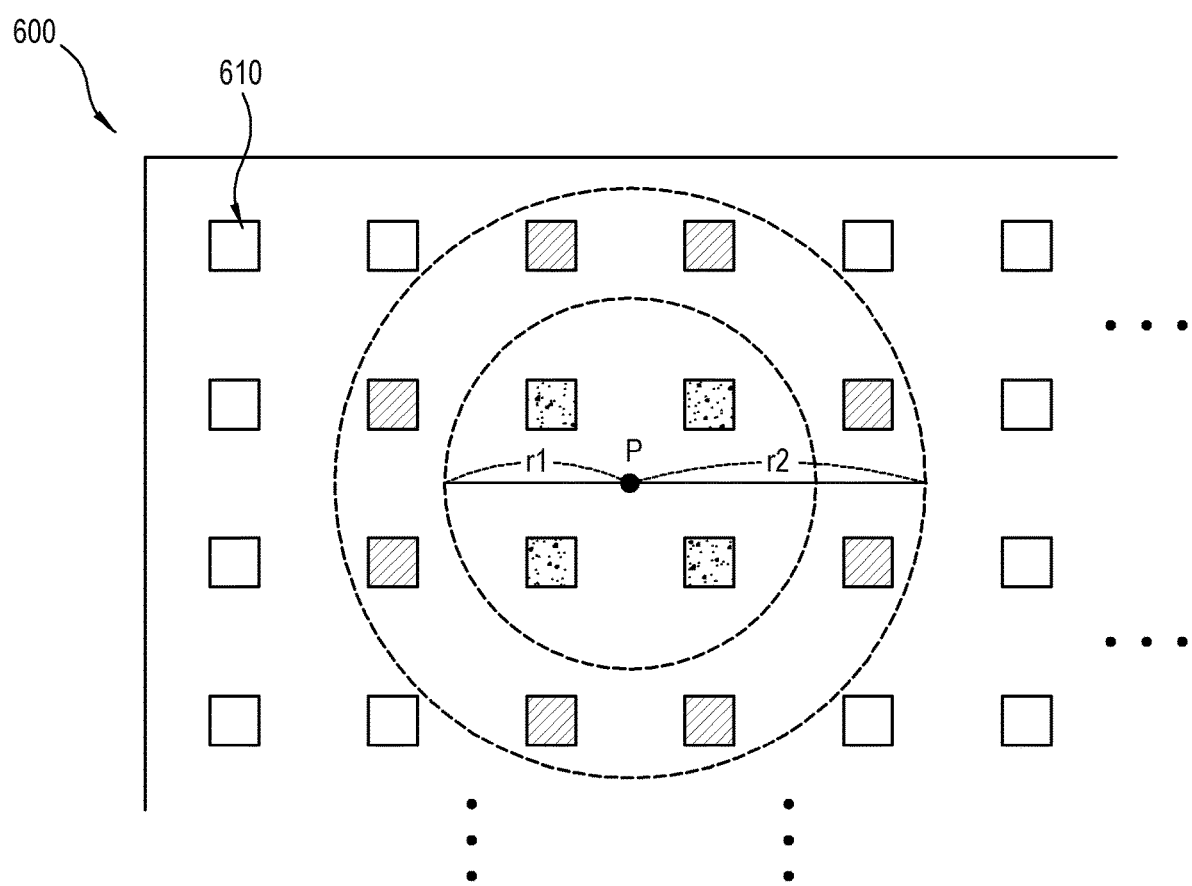
FIG. 6 is a partial plan view showing an array pattern of a plurality of light emitting elements in the display of the display apparatus according to an exemplary embodiment.

FIG. 6 is a partial plan view of showing an array pattern of a plurality of light emitting elements in the display of the display apparatus according to an exemplary embodiment.

As shown in FIG. 6, the display apparatus according to an exemplary embodiment includes a plurality of light emitting elements 610 arrayed in a matrix form and respectively forming pixels of a display 600. Further, the display apparatus has a structure for sensing a touch input. This touch sensing structure is equivalent to those of the foregoing exemplary embodiments, and thus repetitive descriptions will be avoided.

When a user touches a predetermined position P on the display 600, the display apparatus determines the coordinates of the touched position P, and performs previously designated operations in accordance with determination results. According to an exemplary embodiment, when the display 600 has a transparent LED display structure, it may be difficult for a user to recognize whether the touch input the user is normally sensed in the display apparatus.

Accordingly, when sensing the touch input, the display apparatus specifies a position P where a user's touch input is made. The display apparatus determines one or more light emitting elements 610 within a preset range from the specified position P, and adjusts the output characteristics of the determined light emitting elements 610. Thus, the display apparatus can visually show a user whether touch input of the user is normally sensed and where the touch input is made.

Specifically, when a user's touch input is sensed at a certain position P on the display 600, the display apparatus determines the coordinates of the corresponding position P. The display apparatus determines the light emitting elements 610 within a radius of r1 of the determined coordinates position P, and when there are four light emitting elements 610 within the radius of r1, the display apparatus adjusts the output characteristics of these four light emitting elements 610.

According to an exemplary embodiment, it may be previously designated in the display apparatus which output characteristic of the light emitting elements 610 will be adjusted. For example, the display apparatus may increase or decrease the current brightness of the light emitting elements 610 by a preset level. The display apparatus may increase or decrease the current saturation of the light emitting elements 610 by a preset level. The display apparatus may increase or decrease the current intensity of the light emitting elements 610 by a preset level. The display apparatus may replace the current hue of the light emitting elements 610 by a preset hue. Further, the display apparatus may adjust at least two among the brightness, saturation, intensity and hue of the light emitting elements 610. Besides, all the output characteristics representable by the light emitting elements 610 may be adjusted.

In addition, the display apparatus may divide the range into two or more areas with respect to the touched position P, and adjust the output characteristics of the light emitting elements 610 to be different from each other between the areas.

For example, the display apparatus sets a first area within a radius of r1 of the touched position P, and a second area within a radius of r2 of the touched position P except the first area. The display apparatus determines four light emitting elements 610 within the first area, and determines eight light emitting elements 610 within the second area. Here, r2>r1.

When the display apparatus is set to adjust the brightness of the light emitting elements 610, the display apparatus may adjust the brightness of the light emitting elements 610 within the first area to be more decreased than the brightness of the light emitting elements 610 within the second area. In other words, the display apparatus may adjust both the brightness of the light emitting elements 610 within the first area and the brightness of the light emitting elements 610 within the second area, so that the light emitting elements 610 within the first area to be darker than the light emitting elements 610 within the second area. Likewise, the saturation or the intensity may be also adjusted on the same principle.

When the display apparatus is set to adjust the hue of the light emitting elements 610, the display apparatus may control the light emitting elements 610 within the first area to emit light of a first hue, and the light emitting elements 610 within the second area to emit light of a second hue different from the first hue.

In this exemplary embodiment the range is divided into two of the first area and the second area, but not limited thereto. Alternatively, the range may be divided into three or more areas to thereby have a gradation effect with respect to the touched position P.

In this exemplary embodiment, a circular area is set with respect to the specified position P, but not limited thereto. The shape of the area may include various figures as well as a circle.

Figure 7:
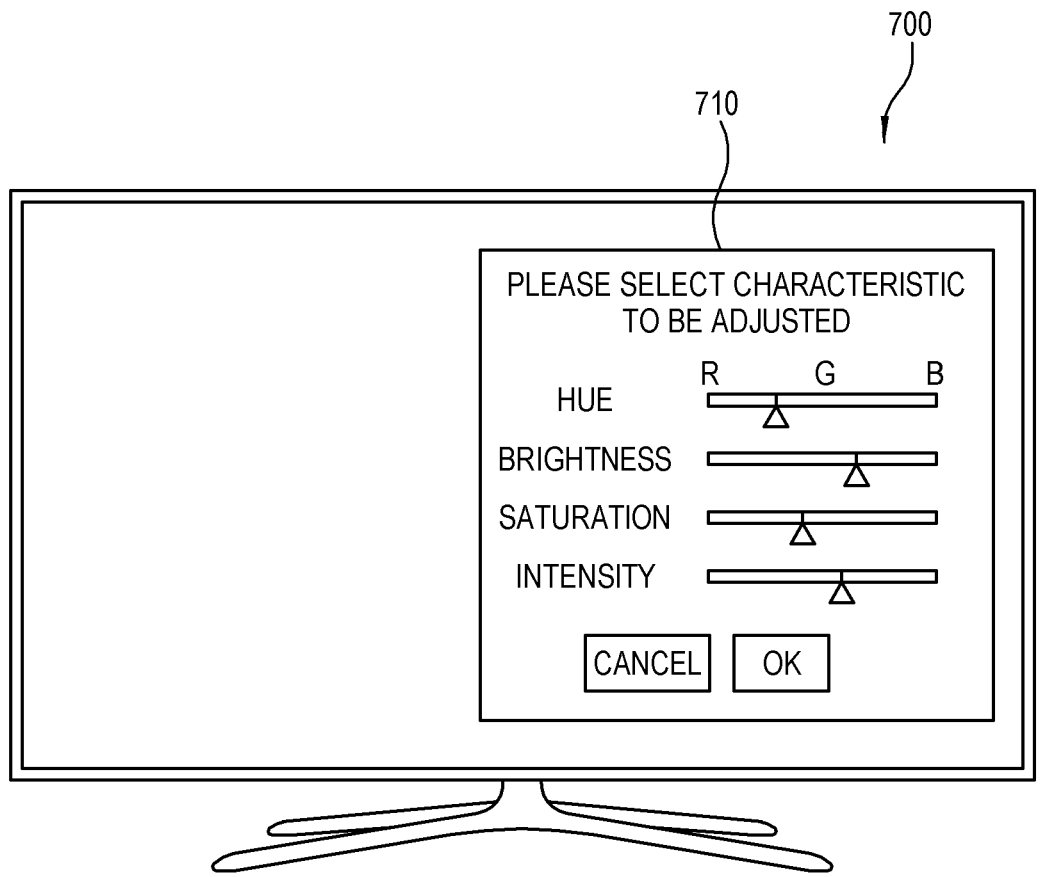
FIG. 7 illustrates an example of a user interface (UI) for setting an output characteristic of the light emitting element to be adjusted in response to a touch input in the display apparatus according to an exemplary embodiment.

FIG. 7 illustrates an example of a user interface (UI) for setting an output characteristic of the light emitting element to be adjusted in response to a touch input in the display apparatus according to an exemplary embodiment.

As shown in FIG. 7, a display apparatus 700 may display a UI 710 for allowing a user to set one among various operations for adjusting the output characteristic of the light emitting element in response to a touch input. Regarding the adjustment of the output characteristic, the display apparatus 700 may have default setting. The UI 710 allows a user to adjust the default setting. The UI 710 may be displayed in response to various kinds of user inputs.

The UI 710 is provided to previously set the characteristics of light, such as hue, brightness, saturation, intensity, etc. There are no limits to the appearance of the UI 710. The UI 710 may be given in such manners that an object shaped like a bar slides to a specific level, a user directly inputs a specific numerical value, etc. or may be given in various graphic user interfaces (GUI).

The UI 710 may be designated to a specific level regardless of the current output of the light emitting element, or set an offset value for reflecting the current output of the light emitting element. In the former case, the display apparatus 700 adjusts the output characteristic of the light emitting element to a level designated through the UI 710 regardless of the current characteristic in response to a touch input. In the latter case, the display apparatus 700 adjusts the level of the output characteristic of the light emitting element by reflecting the offset value designated through the UI 710 in response to a touch input.

Figure 8:
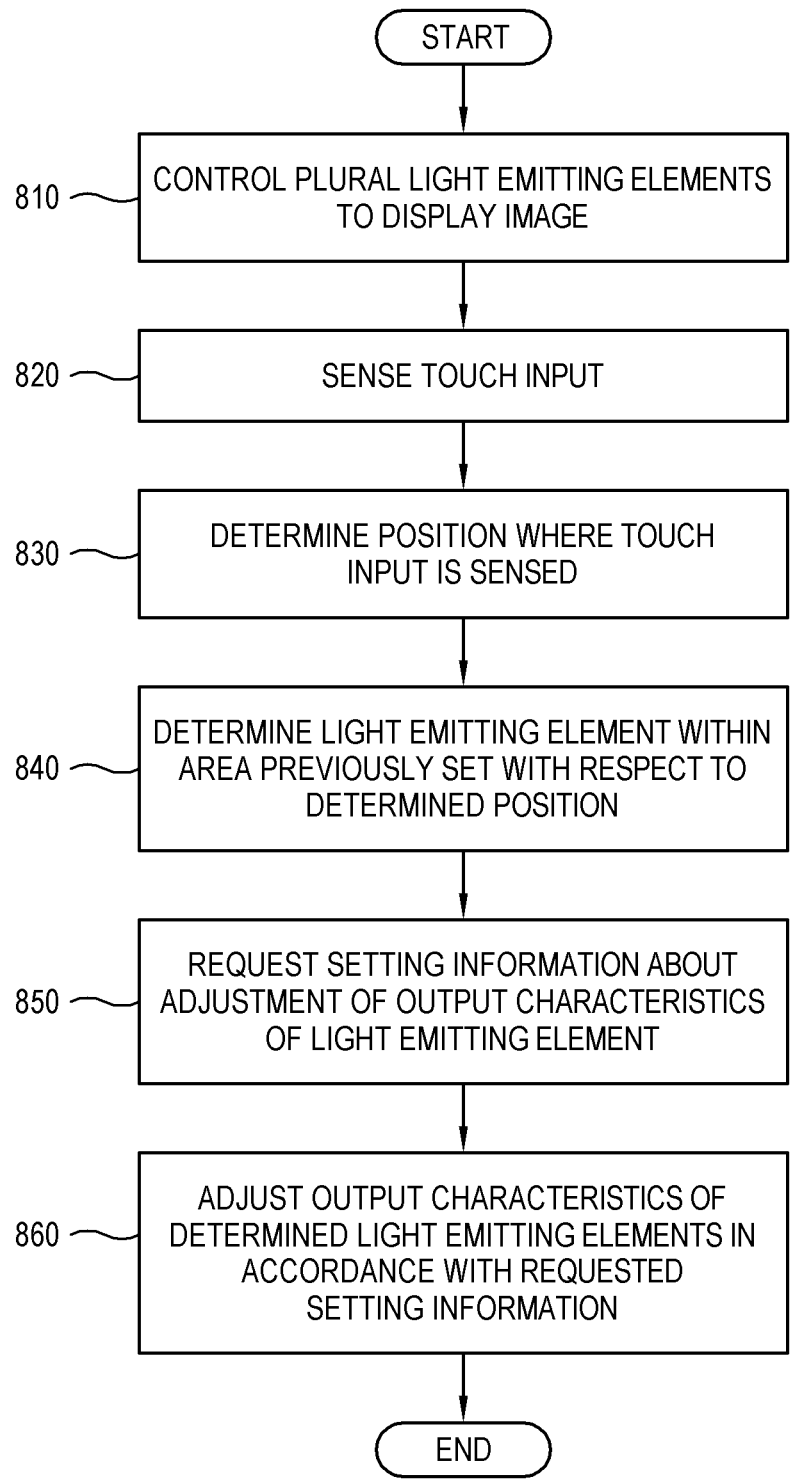
FIG. 8 is a flowchart for adjusting the output characteristic of the light emitting element in response to a touch input in the display apparatus according to an exemplary embodiment.

FIG. 8 is a flowchart illustrating a method of adjusting the output characteristic of the light emitting element in response to a touch input in the display apparatus according to an exemplary embodiment.

As shown in FIG. 8, at operation 810, a display apparatus controls a plurality of light emitting elements to display an image.

At operation 820, the display apparatus senses a user's touch input.

At operation 830, the display apparatus determines a position where the touch input is sensed.

At operation 840, the display apparatus determines light emitting elements within an area previously set with respect to the determined position.

At operation 850, the display apparatus requests for setting information about the adjustment of the output characteristics of the light emitting element. According to an exemplary embodiment, the display apparatus retrieves setting information about the adjustment of the output characteristics of the light emitting element stored in a storage.

At operation 860, the display apparatus adjusts the output characteristics of the determined light emitting elements in accordance with the requested setting information. According to an exemplary embodiment, the display apparatus adjusts the output characteristics of the determined light emitting elements in accordance with the setting information retrieved from the storage.

Thus, the display apparatus according to an exemplary embodiment makes a user clearly recognize the touched position.

According to an exemplary embodiment, the display apparatus may make the output characteristics of the light emitting elements be adjusted variously depending on how a touch input is made, when the touch input is sensed.

Figure 9:
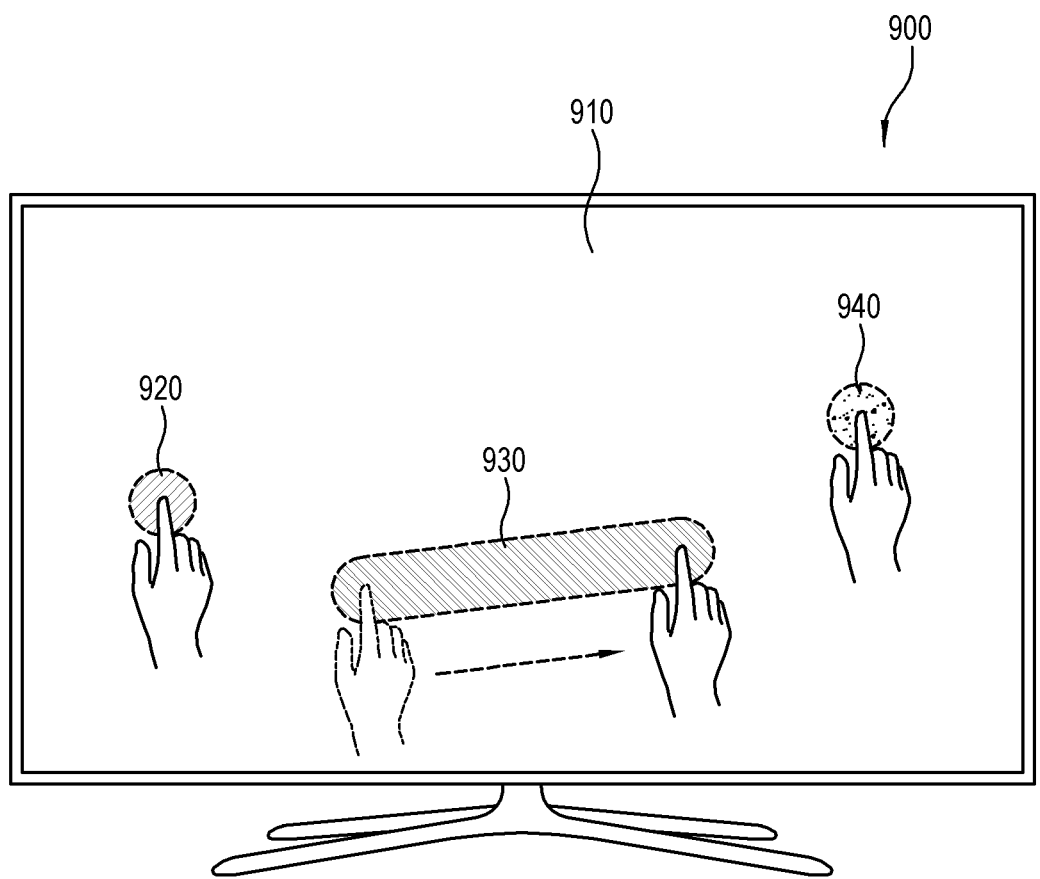
FIG. 9 illustrates an example of the output characteristic of the light emitting element being adjusted depending on the kinds of touch input in the display apparatus according to an exemplary embodiment.

FIG. 9 illustrates an example that the output characteristic of the light emitting element is adjusted depending on the kinds of touch input in the display apparatus according to an exemplary embodiment;

As shown in FIG. 9, when a touch input is sensed on a display 910, a display apparatus 900 determines a position where the touch input is made, determines the light emitting elements corresponding to the determined position, and adjusts the output characteristic of the determined light emitting elements based on preset settings.

The display apparatus 900 determines the kinds of touch input before adjusting the output characteristics of the light emitting elements. For example, the touch input includes a general touch that a user keeps a touch for a preset period of time or more from touching the display 910 with the user's finger, a tap that a user takes the finger off the display 910 within a preset period of time from touching the display 910 with the finger, a double tap that the taps are performed twice in sequence, a drag that a user moves the finger by a predetermined distance or more without taking the finger off the display 910 while touching the display 910 with the finger, etc.

In addition to the foregoing exemplary embodiments where the output characteristic of the light emitting element is adjusted within the area corresponding to the touched position, a display apparatus 900 according to this exemplary embodiment determines the kinds of touch input, and adjusts the output characteristic of the light emitting element in accordance with the determination results. For example, when the touch input is determined as a general touch, the display apparatus 900 adjusts the brightness of the light emitting elements corresponding to a position 920, where the general touch is made, into a first level. When the touch input is determined as a drag, the display apparatus 900 adjusts the brightness of the light emitting elements corresponding to a position 930, where the drag is made, into a second level different from the first level. Further, when the touch input is determined as a tap, the display apparatus 900 adjusts the brightness of the light emitting elements corresponding to a position 940, where the tap is made, into a third level different from the first level and the second level.

Accordingly, according to an exemplary embodiment, the display apparatus 900 adjusts the output characteristic of the light emitting element differently according to the kinds of touch input, thereby clearly distinguishing between the kinds of touch input.

Figure 10:
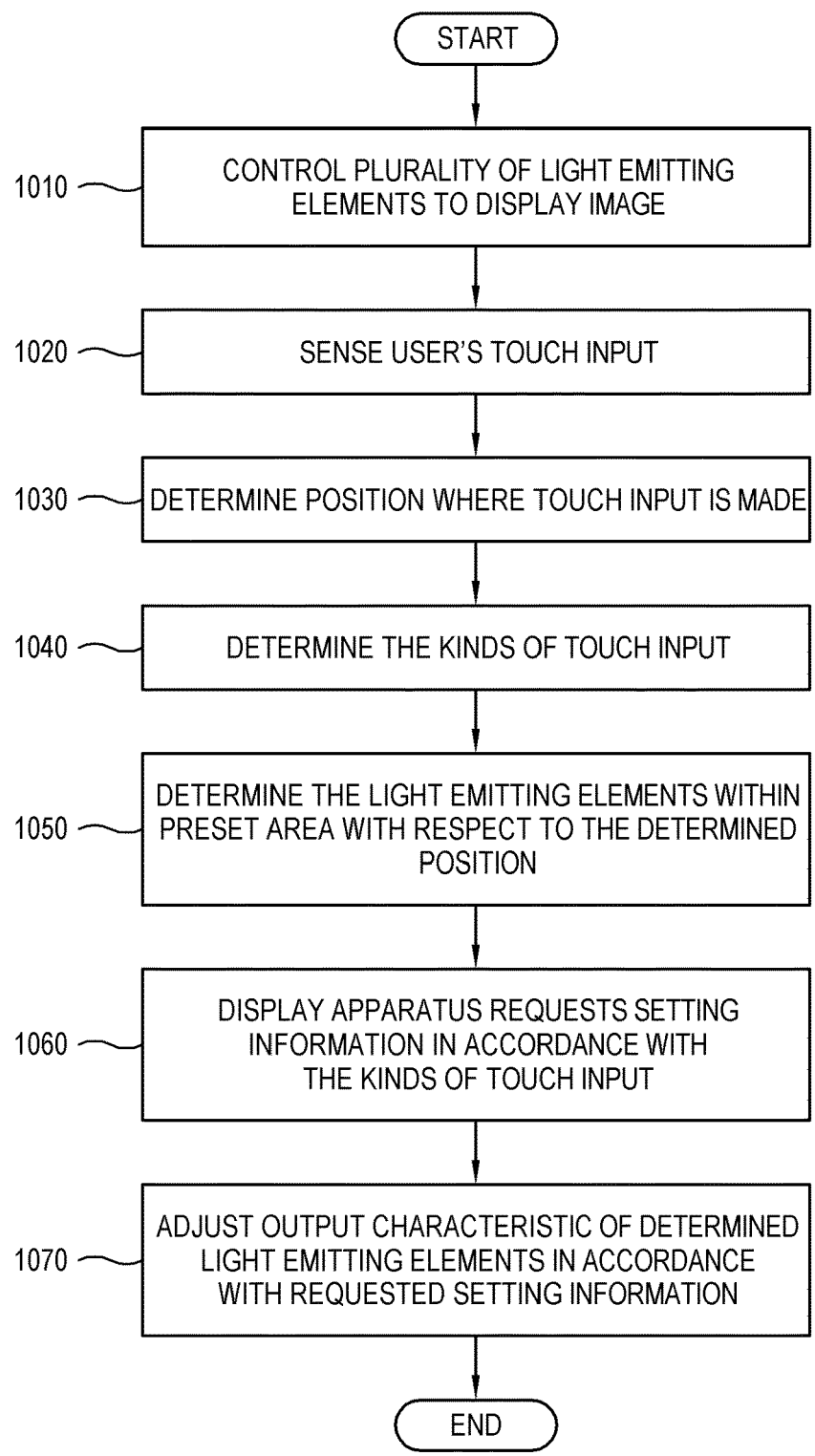
FIG. 10 is a flowchart for adjusting the output characteristic of the light emitting element in accordance with the kind of touch input in the display apparatus according to an exemplary embodiment.

FIG. 10 is a flowchart of adjusting the output characteristic of the light emitting element in accordance with the kinds of touch input in the display apparatus according to an exemplary embodiment.

As shown in FIG. 10, at operation 1010, a display apparatus controls a plurality of light emitting elements to display an image.

At operation 1020, the display apparatus senses a user's touch input.

At operation 1030, the display apparatus determines a position where the touch input is made.

At operation 1040, the display apparatus determines the kinds of touch input.

At operation 1050, the display apparatus determines the light emitting elements within a preset area with respect to the position corresponding to the determined touch input.

At operation 1060, the display apparatus requests for setting information about adjustment for the output characteristic of the light emitting element in accordance with the determined kinds of touch input. According to an exemplary embodiment, the display apparatus retrieves setting information about the adjustment of the output characteristics of the light emitting element stored in a storage in accordance with the determined kinds of touch input.

At operation 1070, the display apparatus adjusts the output characteristic of the determined light emitting elements in accordance with the setting information. According to an exemplary embodiment, the display apparatus adjusts the output characteristics of the determined light emitting elements in accordance with the setting information retrieved from the storage.

Like this, the display apparatus adjusts the output characteristic of the light emitting element differently according to the kinds of touch input, so that a user can clearly recognize difference between the kinds of touch input.

In the foregoing exemplary embodiments, the light-emitting-device driving wiring lines, the touch driving wiring lines, and the touch sensing wiring lines are all arrayed on the top surface of the second substrate, and the insulators are provided at the intersections between the wiring lines. Alternatively, the wiring line structure may be provided on not the top surface of the second substrate but the bottom surface of the first substrate opposite to the second substrate.

Figure 11:
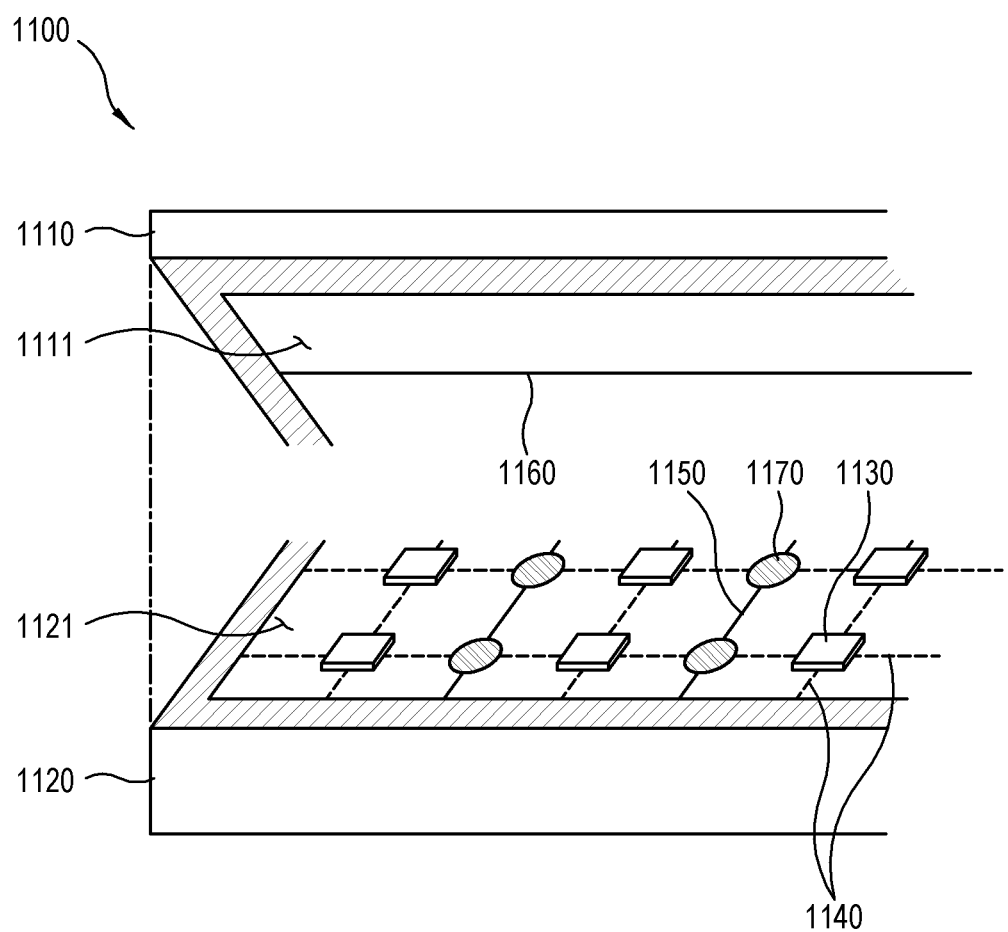
FIG. 11 is an exploded perspective view of the display of the display apparatus according to an exemplary embodiment.

FIG. 11 is an exploded perspective view of the display of the display apparatus according to an exemplary embodiment.

As shown in FIG. 11, a display 1100 of a display apparatus according to an exemplary embodiment includes a first substrate 1110, a second substrate 1120 arranged parallel with the first substrate 1110, a plurality of light emitting elements 1130 arrayed on a top surface 1121 of the second substrate 1120, and light-emitting-device driving wiring lines 1140 formed on the top surface 1121 of the second substrate 1120 to apply a driving signal to the light emitting elements 1130.

According to this embodiment, one of a touch driving wiring line 1150 and a touch sensing wiring line 1160 for sensing a touch input is arrayed on the top surface 1121 of the second substrate 1120, and the other of the touch driving wiring line 1150 and the touch sensing wiring line 1160 is arranged on the bottom surface 1111 of the first substrate 1110. Here, the bottom surface 1111 of the first substrate 1110 faces with the top surface 1121 of the second substrate 1120.

For example, the touch driving wiring line 1150 is arrayed on the top surface 1121 of the second substrate 1120. Further, an insulation cover 1170 is provided at an intersection between the light-emitting-device driving wiring lines 1140 and the touch driving wiring line 1150, thereby insulating the light-emitting-device driving wiring lines 1140 and the touch driving wiring line 1150 from each other.

According to an exemplary embodiment, the touch sensing wiring line 1160 is extended in a direction of traversing the touch driving wiring line 1150 on the bottom surface 1111 of the first substrate 1110. When the first substrate 1110 and the second substrate 1120 adhere to each other, a gap is formed in between the first substrate 1110 and the second substrate 1120 or an adhesive member insulates the first substrate 1110 from the second substrate 1120. Therefore, according to this exemplary embodiment, no insulation cover is needed in between the touch sensing wiring line 1160 and the light-emitting-device driving wiring lines 1140, and no insulation cover is needed in between the touch sensing wiring line 1160 and the touch driving wiring line 1150.

Further, according to this exemplary embodiment, the touch sensing wiring line 1160 is provided on the bottom surface 1111 of the first substrate 1110, and the touch driving wiring line 1150 is provided on the top surface 1121 of the second substrate 1120. However, according to an alternative embodiment, the touch driving wiring line 1150 may be provided on the bottom surface 1111 of the first substrate 1110 and the touch sensing wiring line 1160 may be provided on the top surface 1121 of the second substrate 1120.

According to an exemplary embodiment, as illustrated in FIG. 3, one touch driving wiring line or one touch sensing wiring line may be arranged in between two adjacent light-emitting-device driving wiring lines. However, depending on a space between the plurality of light emitting elements or a space between the plurality of light-emitting-device driving wiring lines, it may be variously designed how many touch driving wiring lines or touch sensing wiring lines will be arranged in between two adjacent light-emitting-device driving wiring lines.

Figure 12:
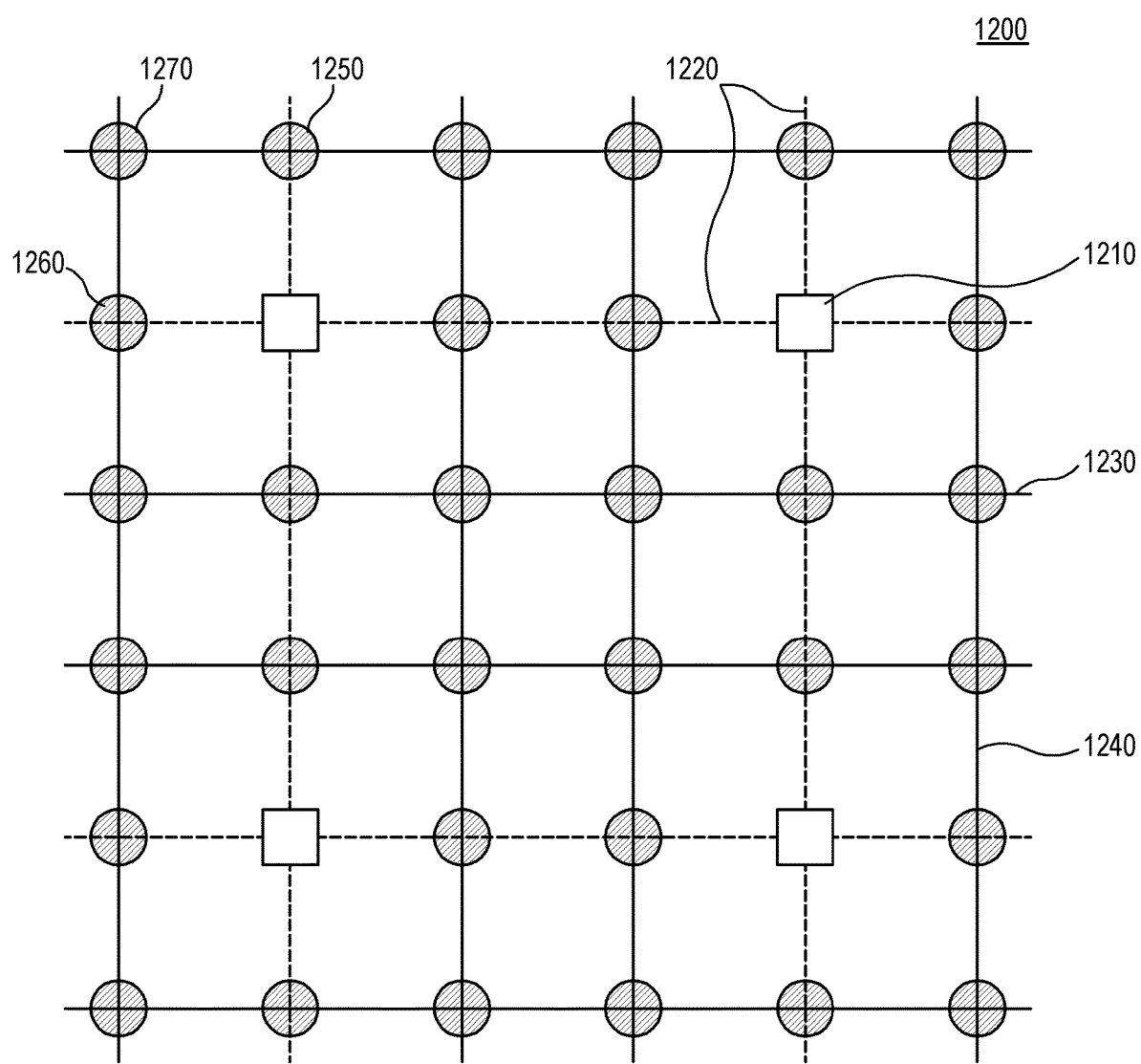
FIG. 12 is a partial plan view showing a wiring line structure in the display of the display apparatus according to an exemplary embodiment.

FIG. 12 is a partial plan view of showing a wiring line structure in the display of the display apparatus according to an exemplary embodiment.

As shown in FIG. 12, on a surface of a display 1200, a plurality of light emitting elements 1210 is arrayed in a matrix form, and a plurality of light-emitting-device driving wiring lines 1220 is formed to respectively drive the light emitting elements 1210. Further, to sense a touch input, a plurality of touch driving wiring lines 1230 extended in the horizontal direction and a plurality of touch sensing wiring lines 1240 extended in the vertical direction are formed in between the plurality of light-emitting-device driving wiring lines 1220.

According to an exemplary embodiment, a space in between two adjacent light emitting elements 1210 may be relatively enlarged in accordance with designs. In this exemplary embodiment illustrated in FIG. 12, which is different from the foregoing exemplary embodiments, at least two touch driving wiring lines 1230 and at least two touch sensing wiring lines 1240 may be arranged in between two adjacent light-emitting-device driving wiring line 1220. In this exemplary embodiment, two touch driving wiring lines 1230 and two touch sensing wiring lines 1240 are each arranged in between two adjacent light-emitting-device driving wiring lines 1220. However, this exemplary embodiment is just optional in terms of designs. For example, three or more wiring lines may be arranged therebetween to enhance touch sensitivity.

An insulator 1250 between the light-emitting-device driving wiring line 1220 and the touch driving wiring line 1230, an insulator 1260 between the light-emitting-device driving wiring line 1220 and the touch sensing wiring line 1240, and an insulator 1270 between the touch driving wiring line 1230 and the touch sensing wiring line 1240 are equivalent to those of the foregoing exemplary embodiments, and therefore repetitive descriptions thereof will be avoided as necessary.

In the structure according to an exemplary embodiment more touch sensing electrodes are arranged, and thus touch sensitivity is increased.

The methods according to the foregoing exemplary embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

According to an exemplary embodiment, the elements, components, methods or operations described herein may be implemented using hardware components, software components, or a combination thereof. For example, the hardware components may include a processing device. The processing device, such as the image processor or the controller, may be implemented using one or more general-purpose or special purpose computers, such as, for example, a processor, a controller and an ALU, a DSP, a microcomputer, an FPGA, a PLU, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a first substrate;
   a second substrate arranged to be in parallel with the first substrate;
   a plurality of light emitting elements arrayed in a matrix form on a surface of the first substrate facing the second substrate;
   a plurality of driving wiring lines formed on the surface of the first substrate and configured to apply driving voltages to the plurality of light emitting elements;
   a plurality of sensing wiring lines formed on the surface of the first substrate and configured to output a sensing signal corresponding to a touch input of a user on the second substrate, wherein the sensing signal corresponds to change in voltage due to the touch input in an electromagnetic field generated by the driving voltages transmitted through the driving wiring lines; and
   a plurality of insulators respectively provided in a plurality of areas where the driving wiring lines and the sensing wiring lines intersect with each other to be insulated.

2. The display apparatus according to claim 1, further comprising a processor configured to output the driving voltage to each of the light emitting elements through the driving wiring lines, and sense the touch input based on the sensing signal output from the sensing wiring lines.

3. The display apparatus according to claim 2, wherein the processor is further configured to adjust light emitting characteristic of one or more light emitting elements, among the plurality of light emitting elements, corresponding to a touch position where the touch input is sensed.

4. The display apparatus according to claim 3, wherein the light emitting characteristic to be adjusted comprises at least one of brightness, saturation, intensity and hue of the respective light emitting element.

5. The display apparatus according to claim 3, wherein the processor is further configured to determine the one or more light emitting elements within a preset range with respect to coordinates of the touch position where the touch input is sensed, among the plurality of light emitting elements.

6. The display apparatus according to claim 5, wherein the processor is further configured to adjust the light emitting characteristic of the respective light emitting element by increasing a current level of the light emitting characteristic of the light emitting element by a preset first level, or replacing the current level of the light emitting characteristic of the respective light emitting element by a preset second level.

7. The display apparatus according to claim 6, wherein the processor is further configured to display a user interface (UI), which allows a user to set the preset first level or the preset second level, in response to a preset input event, and store the preset first level or the preset second level set through the UI.

8. The display apparatus according to claim 3, wherein the processor is further configured to divide an area around the touch position into two or more areas, and process the light emitting characteristic of the respective light emitting element to be differently adjusted according to the two or more areas.

9. The display apparatus according to claim 8, wherein the processor is further configured to determine a first area within a first radius of the touch position and a second area within a second radius of the touch position not including the first area, and process the light emitting elements within the first area and the light emitting elements within the second area to be differently adjusted in light emitting characteristic.

10. The display apparatus according to claim 1, wherein the plurality of insulators are spaced apart from each other so that the plurality of insulators do not entirely cover the surface of the first substrate.

11. The display apparatus according to claim 1, wherein at least one of the light emitting element comprises a light emitting diode (LED).

12. The display apparatus according to claim 1, wherein the first substrate and the second substrate comprise a transparent material.

13. The display apparatus according to claim 1, wherein the first substrate comprises a transparent material, and the second substrate comprises an opaque material.

14. The display apparatus according to claim 1, wherein the plurality of insulators are formed on a plurality of separate areas on the driving wiring lines.

15. A display apparatus comprising:
   a plurality of light emitting diodes (LEDs) arrayed in a matrix form on a surface of a first substrate;

a LED driving wiring line formed on the surface of the first substrate and configured to apply a driving voltages to drive the plurality of LEDs;

a touch sensing wiring line formed on the first substrate and configured to output a sensing signal corresponding to a touch input of a user, wherein the sensing signal corresponds to change in voltage due to the touch input in an electromagnetic field generated by the driving voltages transmitted through the LED driving wiring line; and a processor configured to determine at least one LED, among the plurality of LEDs, located within an area surrounding a location where the touch input is sensed by the touch sensing wiring line and adjust an output characteristic of the at least one LED.

16. The display apparatus according to claim 15, wherein the processor is further configured to retrieve setting information based on a type of the touch input, and adjust the output characteristic of the at least one LED in accordance with the setting information.

* * * * *